United States Patent [19]

Takada

[11] Patent Number: 4,655,477
[45] Date of Patent: Apr. 7, 1987

[54] PASSIVE VEHICLE SEAT BELT SYSTEM

[76] Inventor: Juichiro Takada, 3-12-1 Shinmachi, Setagayaku, Tokyo, Japan

[21] Appl. No.: 811,947

[22] Filed: Dec. 20, 1985

[30] Foreign Application Priority Data

Dec. 24, 1984 [JP] Japan .......................... 59-194525[U]
May 28, 1985 [JP] Japan .............................. 60-78539[U]

[51] Int. Cl.⁴ ............................................. B60R 21/10
[52] U.S. Cl. ....................................... 280/804; 242/55
[58] Field of Search ...................... 280/801, 802, 804; 242/55

[56] References Cited

U.S. PATENT DOCUMENTS 4,365,827 12/1982 Takada ................................ 280/804
4,375,897  3/1983 Takada ................................ 280/804
4,445,604  5/1984 Rogers, Jr. ......................... 280/804
4,498,690  2/1985 Takada ................................ 280/804

FOREIGN PATENT DOCUMENTS 2749417  5/1979 Fed. Rep. of Germany ...... 280/804

Primary Examiner—John J. Love
Assistant Examiner—Kenneth R. Rice
Attorney, Agent, or Firm—Brumbaugh, Graves, Donohue & Raymond

[57] ABSTRACT

A passive seat belt system for a vehicle includes a restraint belt, a flexible transfer tape driven by a drive device in response to opening or closing of the vehicle door, and a belt transfer guide connected to the belt and connected to one end of the transfer tape, the guide being movable along a guide rail between restraint and release locations in the vehicle in which it holds the belt in occupant-restraining and occupant-releasing positions, respectively. The drive device comprises a flexible drive tape and a first drum having one end of the drive tape and the other end of the transfer tape attached to the outer periphery thereof whereby upon rotation of the drive in one direction both tapes are wound onto the first drum in interleaved relation and upon rotation in the other direction are unwound from the drum. A second drum is disposed adjacent the path taken by the transfer tape as it leads away from the first drum and has the other end of the drive tape attached to the outer periphery thereof whereby the drive tape is wound onto the second drum upon rotation thereof in one direction and is unwound upon rotation in the other direction. A drive mechanism selectively rotates the first and second drums in their respective tape-winding directions.

5 Claims, 6 Drawing Figures

PASSIVE VEHICLE SEAT BELT SYSTEM

FIELD OF THE INVENTION

The present invention relates to vehicle occupant restraint belt systems and, in particular, to seat belt systems of the so-called passive type in which the belt automatically transfers between a configuration in which the occupant in released and can enter or leave the vehicle and a configuration in which the occupant is restrained, such transfers occurring in response to openings and closings of the vehicle door.

BACKGROUND OF THE INVENTION

It is common knowledge that many vehicle occupants often do not use the restraint belt systems with which the vehicles are equipped, either because they are somewhat of a nuisance to connect and disconnect or because the occupants find them to be uncomfortable. It is well established, however, that vehicle occupants are less likely to be seriously injured or killed in a collision if they are restrained by a restraint belt system. One way of increasing the frequency of use of a seat belt system is by making the system "passive", in the sense that the belt is automatically applied to the occupant without his or her intervention whenever the occupant enters the vehicle and closes the door, and similarly, is automatically moved to an inactive or release position when the occupant opens the vehicle door to enter or leave the vehicle. There have been numerous proposals in recent years for passive-type vehicle restraint belt systems. Most of the known passive systems use one or more movable belt transfer guides in the form of either a guide ring or a movable anchor located either inboard or outboard of the vehicle seat, such as at the edge of the roof above the door. The movable belt transfer guide is driven back and forth along a guide rail by a drive device.

U.S. Pat. Nos. 4,365,827 (Dec. 28, 1982) and 4,375,897 (Mar. 8, 1983) issued to the present inventor describe and illustrate passive vehicle occupant restraint belt systems in which a shoulder belt leads from an emergency locking retractor affixed to the vehicle floor inboard of the seat upwardly and outwardly across the seat to a movable belt anchor. The belt anchor is slidable along a guide rail that extends along the edge of the roof above the vehicle door. The belt anchor is moved by a drive wire along the guide rail between a rearward restraint position and a forward release position in response to openings and closings of the vehicle door. The drive wire is a so-called racked wire, which comprises a relatively stiff but bendable core wire element and a rack wire element wound spirally onto the core element and suitably fixed, thus providing a form of rack teeth that are capable of being driven by a special gear which, in turn, is driven by a gear-reduced electric motor or a mechanical linkage associated with the door (e.g., a motion amplifier). The racked wire is suitably fixed to the movable anchor and is constrained by a sheath or guide rail to follow a predetermined path between the drive device and the movable anchor.

Inasmuch as the racked wire cannot be severely bent, for example by winding onto a drum or the like, a tail end of the racked wire on the opposite side of the drive gear from the portion that leads from the drive gear to the belt anchor moves back and forth within a tail-end sheath, the length of which is slightly greater than the distance along the guide rail between the release position and restraint position of the movable anchor. The additional length of racked wire and the casing for the tail-end portion of the racked wire significantly contribute to the cost of production and assembly of the drive device. Moreover, the costs of manufacture of the racked wire itself are comparatively large. Furthermore, the tail-end portion takes up valuable space in the vehicle.

In order to reduce the costs of manufacture and assembly of a passive belt system as well as to reduce the space required by the system, particularly the tail-end portion of a racked wire drive, the present inventor has previously proposed a passive belt system in which the movable belt transfer guide or anchor is driven by a wide, thin flexible band or tape. In particular, as described and shown in U.S. Pat. No. 4,498,690 (Feb. 12, 1985), one end of a perforated tape is connected to the movable guide or anchor of a passive belt system, and the other end is fastened to a drive sprocket wheel having teeth that mesh with the perforations in the tape. Upon rotation of the sprocket wheel in one direction, the flexible drive tape is wound onto the sprocket wheel, pulling the guide member in a direction generally toward the sprocket wheel in the process. Upon rotation in the other direction, the sprocket wheel pushes the tape in a direction to move the movable guide member generally away from the drive device, the tape, of course being unwound in the process.

Although the device of U.S. Pat. No. 4,498,690 is generally satisfactory and constitutes an improvement in many respects over the racked wire drive devices, it is not altogether free from possible problems. One such problem involves the possibility of wear and deterioration of the tape, especially in the regions around the perforations. Also the inherent weakness of the tape at all cross sections corresponding to the perforations makes the tape subject to fatigue failure due to bending at these weak points. Another problem is to provide adequate assurance that the tape is accurately guided away from the sprocket wheel when it is being unwound from the reel such that bending or kinking cannot occur, thereby increasing friction and producing a high load on the drive motor. An object of the present invention is to overcome the aforementioned problems. Another object of the invention is to provide a passive restraint belt system having a drive device that is of simple construction, small size, easy to install and reliable in operation.

SUMMARY OF THE INVENTION

There is provided in accordance with the present invention a passive vehicle seat belt system which, like the system described and shown in the aforementioned U.S. Pat. No. 4,498,690, includes a restraint belt, a flexible transfer tape driven by a drive device and responsive to opening or closing of the vehicle door, and a belt transfer guide member connected to the belt and connected to one end of the transfer tape. The belt transfer guide is movable between restraint and release positions in the vehicle in which it holds the belt and occupant-restraining and occupant-releasing positions, respectively, along a guide member.

The present invention is characterized in that the drive device comprises a flexible drive tape and a first drum having one end of the drive tape and the other end of the transfer tape attached to the outer periphery thereof, whereby upon rotation of the first drum in one direction both tapes are wound onto the first drum in interleaved relation and upon rotation in the other direction are unwound from the drum. A second drum is disposed adjacent the path taken by the transfer tape as it leads away from the first drum and has the other end of the drive tape attached to its outer periphery, whereby the drive tape is wound onto the second drum upon rotation thereof in one direction and is unwound upon rotation in the other direction. A suitable drive apparatus is provided for selectively rotating the first and second drums in their respective tape-winding directions.

Preferred embodiments of the invention are further characterized in that the drive apparatus includes a mechanism for selectively driving both drums in their respective tape-unwinding directions. The drive apparatus of the invention may include a gear coupled to the first drum and a gear coupled to the second drum, the respective gears being coupled to each other to drive the drums in rotation in a fixed relationship. Alternatively, the drive assembly may include a pulley coupled to each drum and a timing belt coupling the two pulleys to each other, again, such that both drums are rotated in a predetermined relationship.

In other preferred embodiments the invention is further characterized in that each drum is carried on a shaft, and the drive apparatus includes a drive coupling interlocking the shaft of the first drum with the shaft of the second drum such that the shafts are driven in rotation in a fixed ratio. At least one of the drums is received on its shaft for rotation thereon, and the drive apparatus further includes a resilient lost-motion coupling interposed between the relatively rotatable drum and its shaft biasing the drum to rotate in its tape-winding direction. In this embodiment the slack that would form in the tape due to a phase difference between the linear speeds at the perimeters of the tapes wound on the respective reels are eliminated by the biased rotation of the drum, relative to its shaft, in the winding direction.

For a better understanding of the invention reference may be made to the following description of exemplary embodiments, taken in conjunction with the figures of the accompanying drawings.

DESCRIPTION OF THE EMBODIMENTS

Figure 1:
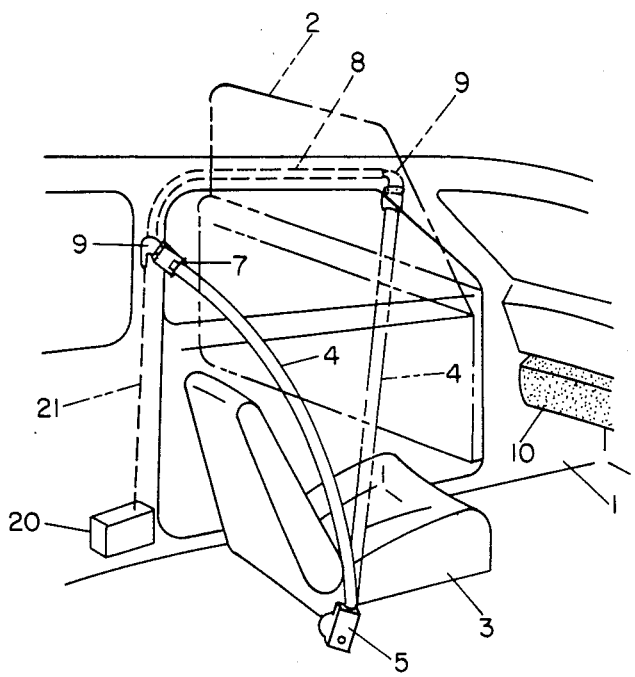
FIG. 1 is a pictorial view in generally schematic form showing an exemplary embodiment of a passive seat belt system according to the present invention.

Referring to FIG. 1, an exemplary embodiment of a passive seat belt system according to the present invention comprises a belt guide member 9 that slides back and forth along a guide rail 8 mounted on the vehicle body 1 at the edge of the roof above the door 2. In response to the opening and closing of the door, the guide member transfers a shoulder belt 4 that leads from an emergency locking retractor 5 mounted inboard of the seat 3 between a forward, occupant-releasing position (shown in FIG. 1 in phantom lines) and a rearward, occupant-restraining position (shown in FIG. 1 in solid lines). The guide member is coupled to a drive mechanism 20 located on the vehicle body 1 rearwardly of the seat 3. A flexible transfer tape 21 is selectively extended from or retracted into the drive device 20, the free end of the tape 21 being attached to the belt guide member 9 such that the guide member 9 is slided along the belt guide rail 8 in accordance with the movement of the tape 21 as it is extended from or retracted into the drive device 20.

The desired characteristics for the transfer tape 21 are best obtained from a composite construction. The tape has a rectangular and flat cross section and may comprise a semi-rigid synthetic material such as a polymeric resin (nylon or polyurethane), a thin metal band encased within a casing of polymeric material or a metal band of uniform cross section.

Figure 3:
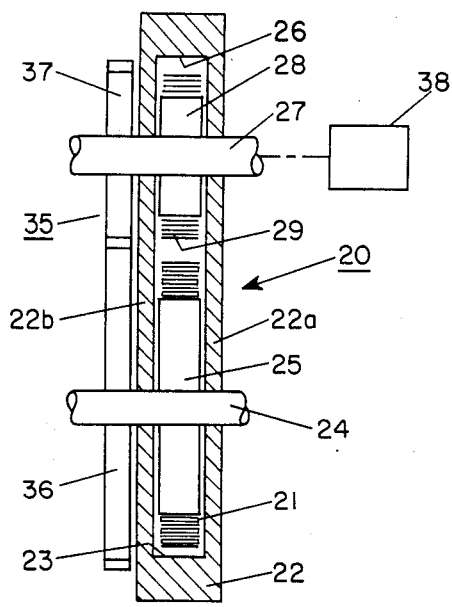
FIG. 3 is an end cross-sectional view of the device of FIG. 2 taken generally along a broken plane indicated by the lines III—III in FIG. 2.
Figure 2:
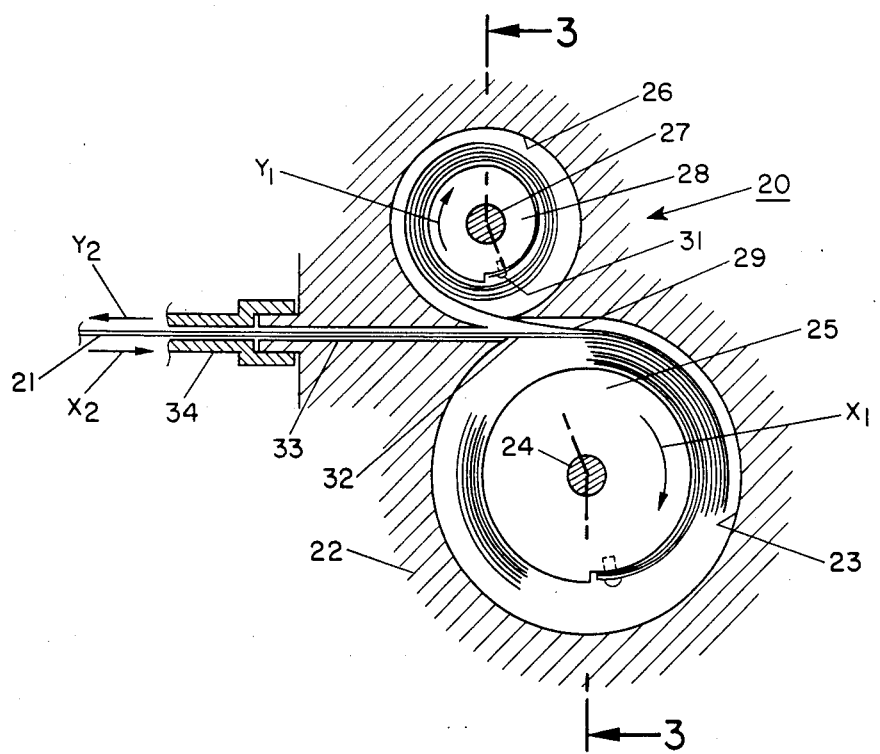
FIG. 2 is a side cross-sectional view, also in generally schematic form, of a drive device suitable for use in the invention.

As shown in FIGS. 2 and 3, the drive device 20 for the transfer tape 21 includes a first drum 25 of a relatively larger diameter housed in a compartment 23 formed on a casing 22 and mounted on a shaft 24 rotatably supported in the side walls 22a, 22b of the casing 22 and a second drum 28 of relatively smaller diameter housed in a compartment 26 formed adjacent to the compartment 23.

The first drum 25 has the base end of the transfer tape 21 and one end of a length of a drive tape 29 attached to the outer periphery thereof by a fastener 30 such that both tapes can be wound onto it in interleaved relation and unwound from it. The second drum 28 has the other end of the drive tape 29 attached to its outer periphery by a fastener 31 and stores the drive tape 29, which is retractable separately from the transfer tape 21. The transfer tape 21 leads from the first drum 25 through a guide passage 33 while the drive tape 29 passes through a passage 32 connecting the compartments 23 and 26. The transfer tape 21 is slidably guided to the belt guide member 9 by a sheath or guide rail 34.

The drive tape 29, the ends of which are attached to the first drum 25 and the second drum 28, respectively, and which is wound onto the respective drums, must be at least as long as the distance of the movement of the belt guide member 9 along the guide rail 8 and should be of a material that is substantially inextensible and of high tensile strength, such as a thin metal band. Moreover, the drive tape 29 should be as thin as possible so as to limit the thickness of the layers of the same when wound onto the first drum 25 with the transfer tape 21.

Reference numeral 35 denotes a gear mechanism located outside of the casing 22. The gear mechanism 35 comprises a gear 36 of large diameter which is mounted on a shaft 24 of said first drum 25 and a gear 37 of small diameter mounted on a shaft 27 of said second drum 28 and transmits rotational torque of a drive motor 38 coupled to the shaft 27 of said second drum 28 to said first drum 25 through the gear 37 of small diameter and the gear 36 of large diameter so as to rotate the first drum 25 and the second drum 28 in opposite directions.

The above is the construction of the passive belt system according to the present invention, and the operation of the same is as follows. First, as shown by the solid lines in FIG. 1, when the belt guide member 9 is in the occupant-restraining position in the rearward end of the guide rail 8 and the door 2 is opened, the drive motor 38 is energized to rotate in one direction by action of a door responsive switch (not shown) to rotate the second drum 28 in a direction indicated by an arrow $Y_1$ (FIG. 2). The drive tape 29, which is then wound onto the first drum 28, unwinds from the first drum 25, together with the transfer tape 21 and is wound onto the second drum 28. The transfer tape 21 is pushed out in a tangential direction. The drive tape constrains the transfer tape to be held tightly on the drum 25 and pushed out of the casing rather than being partly uncoiled into loose turns that eventually would be forced out against the wall of the compartment 23.

As a result, the tape 21, which is guided along the guide passage 33 and the guide rail 34, is pushed in a direction indicated by an arrow $Y_2$. Accordingly, the belt guide member 9 attached to the end of the transfer tape 21 moves to the release position shown by the phantom lines in FIG. 1 along the guide rail 8.

When the vehicle occupant gets into the vehicle, takes the seat 3 with the vehicle door open and then closes the vehicle door 2, the drive motor 38 rotates in a reverse direction to rotate the first drum 25 in a direction indicated by an arrow $X_1$ shown in FIG. 2 so as to wind the transfer tape 21 conjointly with the drive tape 29 onto the first drum 25 in interleaved relation around the periphery thereof. Accordingly, the transfer tape 21 moves in a direction indicated by an arrow $X_2$ (FIG. 2) through the sheath 34 and the guide passage 33, whereupon the belt guide member 9 is pulled by the transfer tape 21 to the occupantrestraining position along the guide rail 8 where it is locked in the restraint configuration by a suitable locking mechanism (not shown).

Figure 4:
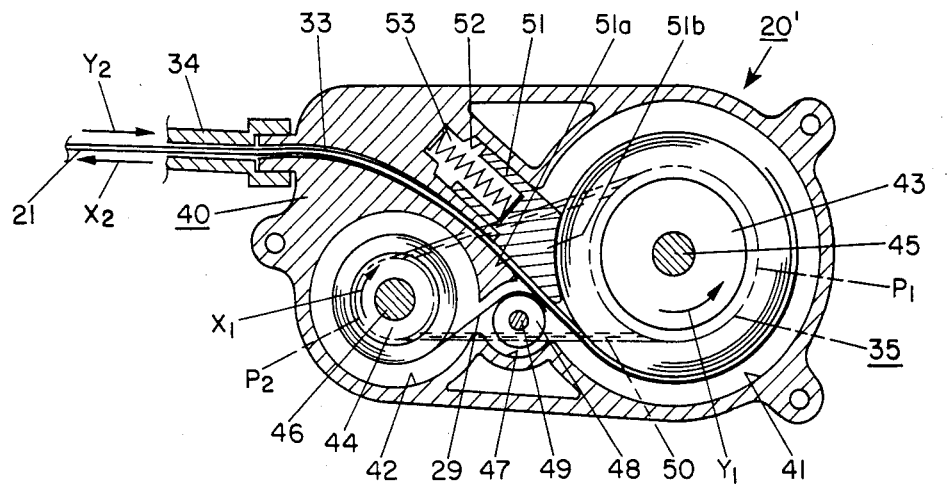
FIG. 4 is a side cross-sectional view of another embodiment of a drive device suitable for use in the present invention.

FIG. 4 shows another embodiment of a drive mechanism 20' applicable to the passive restraint belt system according to the present invention. A compartment 41 of large diameter and a compartment 42 of small diameter formed integrally in a casing 40 respectively receive rotatably a first drum 43 and a second drum 44, each fixedly attached to shafts 45 and 46. A roller section 47 of the casing rotatably receives a guide roller 48 journalled by a shaft 49.

The first drum 43 and the second drum 44, respectively, have pulleys $P_1$ and $P_2$ attached to corresponding ends of the shafts 45 and 46 and are interlocked by a timing belt 50 so that the first and second drums 43 rotate at a fixed ratio.

As in the first embodiment, the first drum 43 has one end of a transfer tape 21 and one end of a drive tape 29 attached thereto. The other end of the drive tape 29 is attached to the outer periphery of the second drum 44 so that it winds onto the second drum 44. The transfer tape 21 is guided away from the drum 43 through a guide passage 33 formed in the casing 40 and leads through a sheath 34 to the guide member 9.

The reference numeral 51 denotes a press member disposed along the path of the transfer tape 21. The press member 51 has a side face 51a parallel to a side face of the guide passage 33 and is biased by a spring 53 provided between the bottom 52 of a guide groove of said casing 40 in a direction such that the arcuate guide face 50b is pressed against the surface of the drive tape 29 as it is wound onto the first drum 43.

The drive mechansim 20' of FIG. 4, like that of FIGS. 2 and 3, is driven by a drive motor (not shown) to rotate the second drum 44 in a direction indicated by an arrow $X_1$ to unwind the drive tape 29 from the first drum 43 conjointly with the transfer tape 21, whereby the transfer tape 21 is pushed out in a direction indicated by an arrow $X_2$ to transfer the belt guide member 9 from the restraint to the release position. To return the belt guide member 9 to the occupant-restraining position, the first drum 43 is rotated in a direction indicated by an arrow $Y_1$ to wind the transfer tape 21 and the drive tape 29 around the circumference of said first drum 43 in interleaved relation so as to move the tape 21 in a direction indicated by an arrow $Y_2$.

In the respective embodiments described above, the first drums 25 and 43 and the second drums 28 and 44 are coupled by gear mechanisms, but another type of driving method can be used. For example, the rotational torque of the drive motor 38 can be transmitted to the first drums 25 and 43 and the second drums 28 and 44 alternately, such that the respective drums are driven only in a direction in which the tranfer tape 21 and the drive tape 29 are wound onto them, thereby to prevent slackening of the tapes 21 and 29.

More particularly, when the first and second drums are interlocked by a gear mechanism, such as gears or a timing pulley that does not slip, the actual outer diameters of the drums during winding or unwinding alternately increase and decrease in proportion to the thicknesses of the tapes in spite of the fact that the ratio of rotation of the first and second drums remains constant. Moreover, the variations in the overall diameter of the first drum on which both the transfer tape and the drive tape are wound in a superposed configuration are large as compared with the second drum on which only the drive tape is wound. Between the two drums, there is inevitably produced a variable error in the linear speeds of winding and unwinding, which leads to creation of slack between the tapes in relation to the outer periphery of the first drum. Consequently, motion of the tape is retarded, and there is a possibility of damage to the tapes caused by the buckling or tensioning produced in the course of winding or unwinding as a result of the differences in the linear speeds of the perimeters of the drums.

One way of eliminating the effect of the variations in overall diameters of the drums (i.e., including the layers of the tapes on them) during winding is the one mentioned above, a shiftable drive transmission that drives each drum selectively only in the winding direction. With this design, the drum from which a tape (or tapes) is unwound idles and is driven by the unwinding tape only. Another solution is to use gear mechanisms (gears or pulleys and belts) but to provide clutches to allow slippage between the drums and the gear mechanisms. A third solution is presented in the embodiment of FIGS. 5 and 6.

Figure 5:
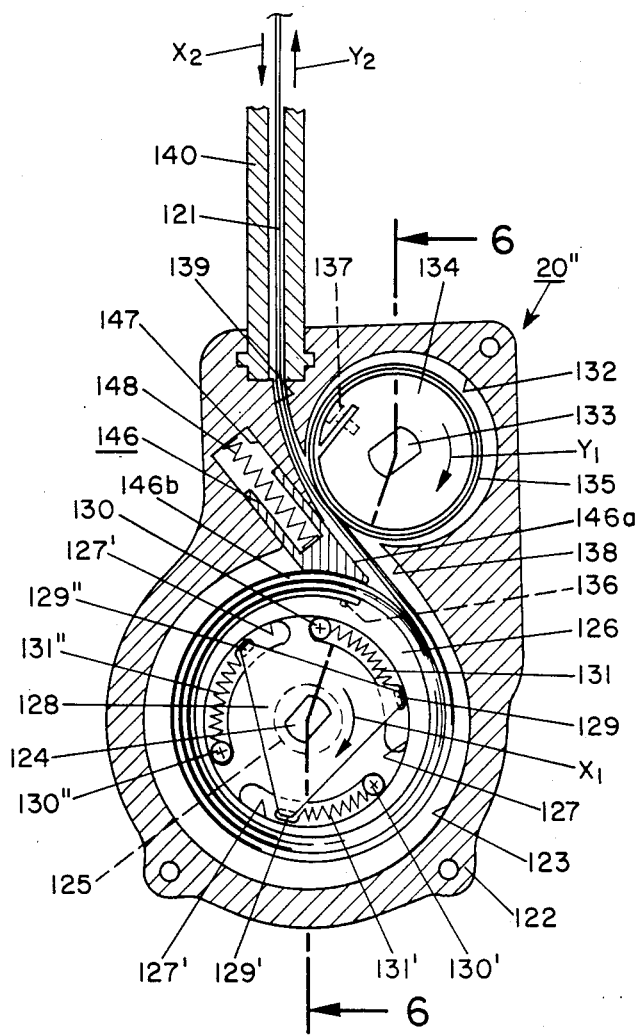
FIG. 5 is a side cross-sectional view of a third embodiment of a drive device suitable for use in the present invention.
Figure 6:
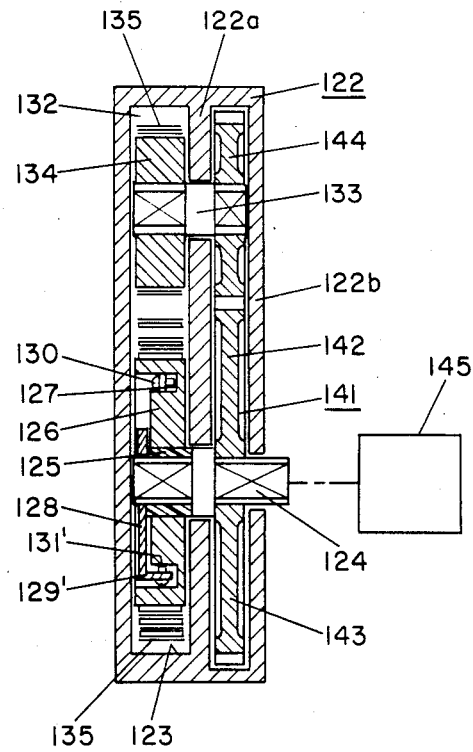
FIG. 6 is an end cross-sectional view of the embodiment of FIG. 5 taken generally along a broken plane represented by lines VI—VI of FIG. 5.

A drive mechanism 20" for a transfer tape 121, as shown in FIGS. 5 and 6, includes a first drum 126 mounted on a drum shaft 124 such that it is rotatable. The drum shaft 124 passes through an inner wall 122a and an outer wall 122b in a large diameter compartment 123 formed within a casing 122. A bushing 125 is interposed between the first drum 126 and the drum shaft 124. Lugs 129, 129', 129" of a triangular drive plate 128 fixed to the end portion of the drum shaft 124 are bent to protrude into arcuate grooves 127, 127', 127" formed in the side of the first drum 126. With this arrangement, the first drum 126 is allowed to rotate relative to the drum shaft 124 within a predetermined angle equal to the extents of the arcuate grooves. Furthermore, the first drum 126 and the drum shaft 124 are arranged to rotate conjointly when the lugs 129, 129', 129" are engaged with the respective end portions of the grooves 127, 127', 127". Tension springs 131, 131', 131" are connected between each of the lugs 129, 129', 129" of the drive plate 128 and machine screws 130, 131', 130" fixed to the respective end portions of the aforementioned grooves 127, 127', 127".

A second drum 134 secured (fixedly) to a drum shaft 133 is received within a small diameter compartment 132 located adjacent to the large diameter compartment 123 in the casing 122, the drum shaft 133 being rotatably received in the casing inner wall 122a.

One end of a transfer tape 121 is fastened by a fastener 136 to the drum 126 and the other end is attached to the belt guide member 9. One end of a drive tape 135 is also attached to the outer periphery of the drum 126 by the fastener 136. The other end of the drive tape 135 is attached to the outer periphery of the second drum 134 by a fastener 137. Both the drive tape 135 and the transfer tape 121 run tangentially to both drums along a passage 138 in the casing. The transfer tape 121 separates from the drive tape 136 adjacent the drum 135 and runs through a guide passage 139 and a sheath 140 to the guide member 9.

A gear mechanism comprising a gear 143 of large diameter mounted on the shaft 124 of the first drum 126 and a gear 144 of small diameter mounted on the shaft 133 of the said second drum 134 transmits the rotational torque of a drive motor 145 coupled to the shaft 124 of the first drum 126 to the second drum 134 so as to rotate the first drum 126 and the second drum 134 in opposite directions at a fixed ratio.

A press member 146 located in the middle of the passage 138 includes a side surface 146a parallel to the side wall of the guide passage 138. The press member 146 is urged in a direction to constantly press an arcuate guide surface 146b against the outer surface of the drive tape 135 by a spring 148 compressed between the press member 146 and the bottom end of a guide groove 147 of the casing 122.

The operation of the embodiment is described as follows. First, as shown by the solid lines in FIG. 1, when the belt guide member 9 is in the occupant-restraining position in the rearward end of the guide rail 8 and the door 2 is opened, the drive motor 138 rotates in one direction by action of a door responsive switch (not shown) to rotate the second drum 134 in a direction indicated by an arrow $Y_1$. The drive tape 135 is unwound from the first drum 126, together with the transfer tape 121, and is wound onto the second drum 134, whereby the tape 121 is pushed out in the direction indicated by the arrow $Y_2$.

Meanwhile, the overall diameter of the first drum and the tape layers 126 is quickly reduced as the two tape layers unwind from it. At the same time, the overall diameter of the second drum and the layer of drive tape is gradually increased. The rate at which the diameter of the first drum 126 is reduced is greater than the rate at which the second drum 134 is increased. Nevertheless, it is possible to push the transfer tape 121 out of the drive device without either slackening or severely tensioning either of the tapes by virtue of the resilient lost-motion coupling between the drive plate 128 and the drum 126.

The respective drum shafts 124 and 133 are rotated at constant rates by the drive mechanism 141. The first drum 124, however, is driven at a speed faster than that required to produce equal peripheral speeds of the tapes on the drums when the tapes are fully wound on the drum 126. Therefore, the tapes would initially be unwound from the drum 126 at a linear speed greater than the speed at which the drive tape would be wound onto the drum 134, if the drum 126 were to be directly coupled to the shaft 124, and slack would form in the tapes in the passage 138. However, the tension springs 131, 131' and 131" constantly urge the drum 126 to rotate in a direction counter to the unwinding direction of rotation of the shaft, thereby eliminating the slack.

As the tapes unwind from the drum 126, the changes in the diameters of the respective drums 126 and 134 cause the amount of the lag between the drum 126 and the shaft 124 and drive plate 128 to diminish; hence, the drum gradually rotates relative to the shaft in the unwinding direction during unwinding. Meanwhile, the transfer tape moves the safety belt toward and finally to the release configuration.

When an occupant enters the vehicle and closes the door, the drive motor 145 drives the shaft 124 and drive plate 128 in the direction indicated by the arrow $X_1$ in FIG. 5. The gears drive the drum 134 counterclockwise. Accordingly, the drive tape 135 is unwound from the drum 134, and both tapes are wound onto the drum 126. As winding progresses, the changes in the respective diameters of the rolls causes the ratio of the drive speeds of the shafts to move increasingly out of phase with the ratios of the diameters. The drum 126 cannot, however, run ahead of the drum 134 (which would cause severe tension in the drive tape). Instead the drum 126 lags behind the shaft 124 and the drive plate 128. The springs 131, 131' and 131" are gradually elongated, and energy is stored in them, which will be recovered during the next operation of the system.

The resilient lost-motion coupling arrangement between the drum and its shaft can be used in the second drum 134 instead of the first drum. Moreover, it can be used in both drums.

I CLAIM:

1. A passive seat belt system for a vehicle having a restraint belt, a flexible transfer tape driven by a drive device in response to opening or closing of the vehicle door, a belt transfer guide connected to the belt and connected to one end of the transfer tape, the guide being movable between restraint and release locations in the vehicle in which it holds the belt in occupant-restraining and occupant-releasing positions, respectively, along a guide rail characterized in that said drive device comprises a flexible drive tape, a first drum having one end of the drive tape and the other end of the transfer tape attached to the outer periphery thereof whereby upon rotation of the drive in one direction both tapes are wound onto the first drum in interleaved relation and upon rotation in the other direction are unwound from the drum, a second drum disposed adjacent the path taken by the transfer tape as it leads away from the first drum and having the other end of the drive tape attached to the outer periphery thereof whereby the drive tape is wound onto the second drum upon rotation thereof in one direction and is unwound upon rotation in the other direction, and drive means for selectively rotating the first and second drums in their respective tape-winding directions.

2. A passive seat belt system according to claim 1 and further characterized in that said drive means further includes means for selectively driving both drums in their respective tape-unwinding directions.

3. A passive seat belt system according to claim 2 and further characterized in that the drive means includes a gear coupled to the first drum, and a gear coupled to the second drum, the respective gears being coupled to each other to drive the drums in rotations that have a fixed relationship.

4. A passive seat belt system according to claim 2 and further characterized in that the drive means includes a transmission belt mechanism having a pulley coupled to each drum and a timing belt coupling the two pulleys.

5. A passive seat belt system according to claim 2 and further characterized in that each drum is carried on a shaft, the drive means includes a drive coupling interlocking the shaft of said first drum with the shaft of said second drum such that they are driven in rotation in a fixed ratio, at least one of the drums is received on its shaft for rotation thereon, and the drive means further includes a resilient lost-motion coupling interposed between said at least one drum and its shaft biasing the drum to rotate in its tapewinding direction, whereby the slack that would form in the tape due to a phase difference between the linear speeds at the perimeter of the tapes wound on the respective reels as they wind onto and unwind from the drums are eliminated by biased rotation of said at least one drum on its shaft.

* * * * *